(12) United States Patent
Shi

(10) Patent No.: US 9,983,387 B2
(45) Date of Patent: May 29, 2018

(54) PHOTOGRAPHIC OPTICAL SYSTEM

(71) Applicant: Rongbao Shi, Shenzhen (CN)

(72) Inventor: Rongbao Shi, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 57 days.

(21) Appl. No.: 15/354,274

(22) Filed: Nov. 17, 2016

(65) Prior Publication Data

US 2017/0184822 A1 Jun. 29, 2017

(30) Foreign Application Priority Data

Dec. 24, 2015 (CN) .......................... 2015 1 0992136
Jul. 20, 2016 (JP) ................................ 2016-142871

(51) Int. Cl.
*G02B 3/02* (2006.01)
*G02B 13/18* (2006.01)
*G02B 13/00* (2006.01)
*G02B 9/64* (2006.01)
*G02B 27/00* (2006.01)

(52) U.S. Cl.
CPC ........... *G02B 13/0045* (2013.01); *G02B 9/64* (2013.01); *G02B 27/0025* (2013.01)

(58) Field of Classification Search
CPC ...... G02B 13/0045; G02B 13/18; G02B 9/64; G02B 27/0025; G02B 3/04
USPC ................. 359/708, 755, 773, 791, 795, 754
See application file for complete search history.

(56) References Cited

U.S. PATENT DOCUMENTS

| | | | |
|---|---|---|---|
| 2015/0268448 A1* | 9/2015 | Kubota | .................... G02B 9/64 359/755 |
| 2016/0124191 A1* | 5/2016 | Hashimoto | ........ G02B 13/0045 359/708 |
| 2017/0045714 A1* | 2/2017 | Huang | ............... G02B 13/0045 |

* cited by examiner

*Primary Examiner* — Bumsuk Won
*Assistant Examiner* — Collin X Beatty
(74) *Attorney, Agent, or Firm* — Na Xu; IPro, PLLC

(57) ABSTRACT

The present invention discloses a photographic optical system which includes a first lens (focal length f1), a second lens (focal length f2), a third lens (focal length f3), a fourth lens (focal length f4), a fifth lens (focal length f5), a sixth lens (focal length f6) and a seventh lens (focal length f7). The photographic optical system disclosed in the present invention by optimizing rationally face shape, distributing refractive power, selecting optical material, is designed as a big relative stop photographic optical system, and can provide the imaging performance in low illumination environment.

10 Claims, 3 Drawing Sheets

PHOTOGRAPHIC OPTICAL SYSTEM

FIELD OF THE INVENTION

The present invention discloses a photographic optical system, specifically, a photography optical system of portable electronic devices.

DESCRIPTION OF RELATED ART

In recent years, with the vigorous development of mini photographic lens, the demand of mini picturing module is rising. The general camera sensor is either photosensitive coupling component or complementary metal oxide conductive component. With the progress of semiconductor manufacturing technology, the sensor pixel size is smaller. Combined with current development trend of electronic product of better function, light, thin, short and small, as a result, the mini camera with good imaging quality becomes the mainstream of current market.

In the camera sensor lens, the resolution of image gradually increases, pixel size decreases, the lens shall have high resolution and excellent optical performance, for example, wide angle of lens, imaging in high dynamic range, reducing tolerance sensitivity of the lens, etc. The existing camera lens composed of seven pieces of lens, restricted by the structure, is unable to correct further senior aberration, for example spherical aberration, so that the imaging performance is limited.

Therefore, it is necessary to provide a kind of new technology solution to overcome above disadvantage.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
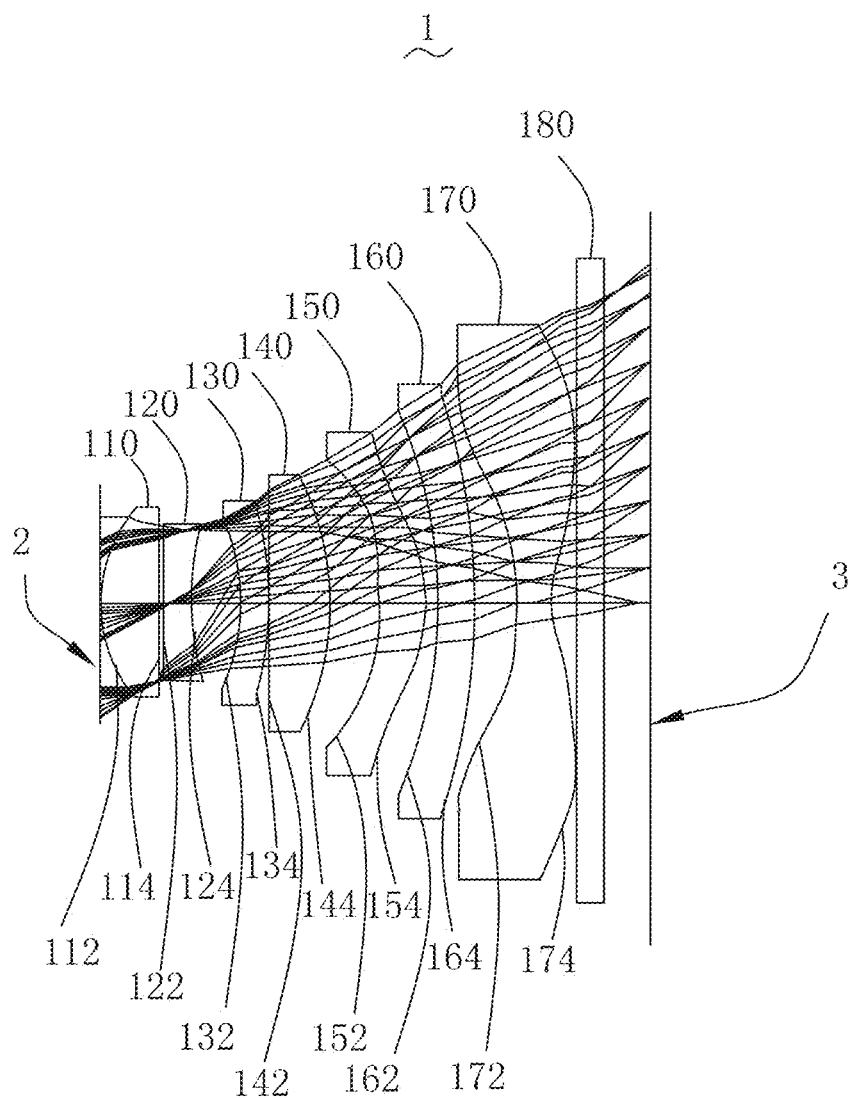
FIG. 1 is an exemplary structural diagram of a photographic optical system of the present disclosure.

Referring to FIG. 1, a photographic optical system, in accordance with an exemplary embodiment of the present disclosure, includes, in an order from an object side surface 2 to an image side surface 3, a first lens 110, a second lens 120, a third lens 130, a fourth lens 140, a fifth lens 150, a sixth lens 160, a seventh lens 170 and glass plate 180.

The specific structure is as follows:

The object side surface is convex, meaning that the object side surface toward the object surface is in convex shape. The object side surface is concave, meaning that the object side surface toward the object surface is in concave shape. The image side surface is convex, meaning that the image side surface toward the image surface is in convex shape. The image side surface is concave, meaning that the image side surface toward the image surface is in concave shape.

The first lens 110 has a positive refractive power and its object side surface 112 is convex, and made of plastic material. The object side surface 112 and the image side surface 114 of the first lens 110 are aspherical. The object side surface 112 of the first lens has one point of inflection. The image side surface 114 of the first lens has one point of inflection and one stagnation point.

The object side surface 122 of the second lens 120 is convex and its image side surface 124 is concave. The object side surface 122 and the image side surface 124 of the second lens 120 are even aspherical. The second lens 120 is made of plastic. The object side surface 122 of the second lens 120 has one point of inflection and one stagnation point. The image side surface 124 of the second lens 120 has one point of inflection.

The third lens 130 is generally in meniscus shape. Its object side surface 132 is concave and its image side surface 134 is convex. The object side surface 132 and the image side surface 134 of the third lens 130 are even aspherical. The third lens 130 is made of plastic. The image side surface of the third lens 130 has one point of inflection.

The image side surface 134 of the third lens 130 is convex. The light beam passing through the second lens 120 is emitted in a small angle thereby, so the aberration of the photographic optical system 1 is improved, and the imaging beams of the photographic optical system 1 are not overlapped in any fields. Together with the first lens 110, the length of the photographic optical system 1 is reduced. In addition, the image side surface 134 of the third lens 130 is a small radius curved face, so that the photographic optical system 1 under the condition of wide field view angle can reduce its sensitivity and ensures the telecentric feature.

The fourth lens 140 is a double convex lens. The object side surface 142 and the image side surface 144 are convex. The object side surface 142 and the image side surface 144 of the fourth lens 140 are even aspherical. The fourth lens 140 is made of plastic. The object side surface of the fourth lens 140 has three points of inflection and one stagnation point.

The object side surface 152 of the fifth lens 150 is concave and the image side surface 154 is convex. The object side surface 152 and the image side surface 154 of the fifth lens 150 are even aspherical. The fifth lens 150 is made of plastic and its object side surface of the fifth lens 150 has one point of inflection. Its image side surface has two points of inflection.

The sixth lens 160 is a negative refractive power lens. The object side surface 162 is concave and its image side surface 164 is convex. The object side surface 162 and the image side surface 164 of the sixth lens 160 are even aspherical. The sixth lens 160 is made of plastic. The image side surface of the sixth lens 160 has one point of inflection.

The seventh lens 170 is a negative refractive power lens. The object side surface 172 is concave and the image side surface 174 is transferred from concave to convex from the place near the optical axis to its circumference, forming a recessed aspheric surface with inflection point, reducing the incident angle of the beam at the image side surface 174. The object side surface 172 and the image side surface 174 of the seventh lens 170 are even aspherical. The seventh lens 170 is made of plastic. The object side surface 172 of the seventh lens 170 has one point of inflection and one stagnation point. The image side surface 174 of the seventh lens 170 has at least one point of inflection and one stagnation point. In this embodiment, the image side surface 174 of the seventh lens 170 has two points of inflection and one stagnation point. In other embodiments, other number of inflection points and the stationary points can be set up as required.

The glass plate 180 is located between the image side surface 174 of the seventh lens 170 and the image side 3. The glass plate 180 can be a filter to filter light. Its type can be selected according to actual requirement.

The second lens 120 and the third lens 130 are made of optical material with high refractive power and low Abbe number, can reduce effectively chromatic aberration of the system. The seventh lens 170 is a negative refractive power lens, can reduce effectively the field curvature of the system. By optimizing rationally the surface shape of the seven lens, distributing refractive power and selecting optical material, the photographic optical system 1 has good imaging performance under low illumination.

In the photographic optical system 1 disclosed in the present invention, in order to realize the design requirement of miniaturization, high sensitivity, high optical performance and wide view angle of the photographic optical system 1, the first lens 110, the second lens 120, the third lens 130, the fourth lens 140, the fifth lens 150, the sixth lens 160, the seventh lens 170 of the photographic optical system 1 shall meet following condition:

1. Focal Length:

The focal length of the first lens 110, the second lens 120, the third lens 130, the fourth lens 140, the fifth lens 150, the sixth lens 160 and the seventh lens 170 of the photographic optical system 1 shall meet the following conditions:

1.5 mm<f1<3 mm; −6 mm<f2<−4 mm; −15 mm<f3<7 mm; 5 mm<f4<10 mm; 5 mm<f5<10 mm; −35 mm<f6<−30 mm;

−5 mm<f7<−2 mm; 0.6<f1/f<0.95; −2<f2/f<−1.5; −3.5<f3/f<−1.2;

1.5<f4/f<2.5; 0.5<f5/f<1.0; −10<f6/f<−5; −1<f7/f<−0.5; where f1: The focal length of the first lens 110;
f2: The focal length of the second lens 120;
f3: The focal length of the third lens 130;
f4: The focal length of the fourth lens 140;
f5: The focal length of the fifth lens 150;
f6: The focal length of the sixth lens 160;
f7: The focal length of the seventh lens 170;
f: Total focal length of the photographic optical system 1.

2. Refractive Power

Under the overall structure of the photographic optical system 1, The refractive power of the first lens 110, the second lens 120, the third lens 130, the fourth lens 140, the fifth lens 150, the sixth lens 160 and the seventh lens 170 of the photographic optical system 1 shall meet the conditions:

1.50<n1<1.55; 1.60<n2<1.70; 1.60<n3<1.70; 1.50<n4<1.55; 1.50<n5<1.55; 1.50<n6<1.55; 1.50<n7<1.55; where n1: The refractive power of the first lens 110;
n2: The refractive power of the second lens 120;
n3: The refractive power of the third lens 130;
n4: The refractive power of the fourth lens 140;
n5: The refractive power of the fifth lens 150;
n6: The refractive power of the sixth lens 160;
n7: The refractive power of the seventh lens 170.

3. Abbe Number

Under the overall structure of the photographic optical system 1, Abbe number of the first lens 110, the second lens 120, the third lens 130, the fourth lens 140, the fifth lens 150, the sixth lens 160 and the seventh lens 170 of the photographic optical system 1 shall meet the conditions:

40<v1<60; 15<v2<30; 15<v3<30; 40<v4<60; 40<v5<60; 40<v6<60; 40<v7<60; where v1: Abbe number of the first lens 110;
V2: Abbe number of the second lens 120;
V3: Abbe number of the third lens 130;
V4: Abbe number of the fourth lens 140;
V5: Abbe number of the fifth lens 150;
V6: Abbe number of the sixth lens 160;
V7: Abbe number of the seventh lens 170.

If the focal length, refractive power and Abbe number of the first lens 110, the second lens 120, the third lens 130, the fourth lens 140, the fifth lens 150, the sixth lens 160 and the seventh lens 170 are exceeding the conditions above, the chromatic aberration and telecentric characteristics of the photographic optical system 1 may be degraded, and will increase the sensitivity of the photographic optical system 1, difficult to realize the miniaturization and wide view angle of the photographic optical system 1, and not conducive to reduce cost of the photographic optical system 1.

In this embodiment, the photographic optical system 1, the focal length, the refractive power and abbe number of the first lens 110, the second lens 120, the third lens 130, the fourth lens 140, the fifth lens 150, the sixth lens 160, the seventh lens 170 and the glass plate 180 are respectively shown in table 1:

TABLE 1

| Type | Focal length (mm) | Refracting power | Abbe number |
|---|---|---|---|
| Photographic optical system | 3.607 | — | — |
| The first lens | 2.768 | 1.543919 | 55.95238 |
| The second lens | −5.944 | 1.644782 | 22.43612 |
| The third lens | −10.702 | 1.644782 | 22.43612 |
| The fourth lens | 6.714 | 1.543919 | 55.95238 |
| The fifth lens | 3.114 | 1.535218 | 56.11525 |
| The sixth lens | −32.006 | 1.543919 | 55.95238 |
| The seven lens | −2.041 | 1.535218 | 56.11525 |
| Glass plate | — | 1.5168 | 64.16734 |

Optical surface, curvature radius (R), sag and semi-diameter (SD) of the first lens 110 (P1), the second lens 120 (P2), the third lens 130 (P3), the fourth lens 140 (P4), the fifth lens 150 (P5), the sixth lens 160 (P6) and the seventh lens 170 (P7) of the photographic optical system 1 are shown in table 2:

TABLE 2

| Lens | Optical surface | Curvature radius R | Sag | Semi-diameter (SD) |
|---|---|---|---|---|
| P1 | Object side surface | 1.567 | 0.279 | 1.754 |
|  | Image side surface | −39.038 | 0.001 | 1.462 |
| P2 | Object side surface | 8.677 | 0.021 | 1.460 |
|  | Image side surface | 2.638 | 0.086 | 1.470 |
| P3 | Object side surface | −3.681 | −0.136 | 1.582 |
|  | Image side surface | −8.26 | −0.094 | 1.882 |

TABLE 2-continued

| Lens | Optical surface | Curvature radius R | Sag | Semi-diameter (SD) |
|---|---|---|---|---|
| P4 | Object side surface | 7.47 | 0.009 | 2.118 |
|  | Image side surface | −7.222 | −0.261 | 2.370 |
| P5 | Object side surface | −5.501 | −0.491 | 2.680 |
|  | Image side surface | −1.303 | −0.478 | 3.192 |
| P6 | Object side surface | −4.345 | −0.337 | 3.576 |
|  | Image side surface | −5.84 | −0.300 | 4.062 |
| P7 | Object side surface | −2.67 | −0.474 | 4.530 |
|  | Image side surface | 1.961 | −0.119 | 5.182 |

The thickness of the first lens 110 (P1), the aperture (ST), the second lens 120 (P2), the third lens 130 (P3), the fourth lens 140 (P4), the fifth lens 150 (P5), the sixth lens 160 (P6), the seventh lens 170 (P7) the glass plate 180 (Tg) of the photographic optical system 1 is shown in table 3:

TABLE 3

|  | Thickness (mm) |
|---|---|
| T1 | 0.457 |
| ST | 0.030 |
| T12 | 0.226 |
| T2 | 0.226 |
| T23 | 0.467 |
| T3 | 0.232 |
| T34 | 0.032 |
| T4 | 0.312 |
| T45 | 0.399 |
| T5 | 0.400 |
| T56 | 0.079 |
| T6 | 0.435 |
| T67 | 0.247 |
| T7 | 0.454 |
| Tg | 0.024 | where,

T1: The thickness of the first lens;
ST: The distance between the image side surface of the first lens and the aperture;
T12: The axial distance from the aperture to the object side surface of the first lens;
T2: The thickness of the second lens;
T23: The axial distance from the aperture to the object side surface of the third lens;
T3: The thickness of the third lens;
T34: The axial distance from the image side surface of the third lens and the object side surface of the fourth lens;
T4: The thickness of the fourth lens;
T45: The axial distance from the image side surface of the fourth lens to the fifth lens;
T5: The thickness of the fifth lens;
T56: The axial distance from the fifth lens to the sixth lens;
T6: The thickness of the sixth lens;
T67: The axial distance from the sixth lens to the seventh lens.

Figure 2:
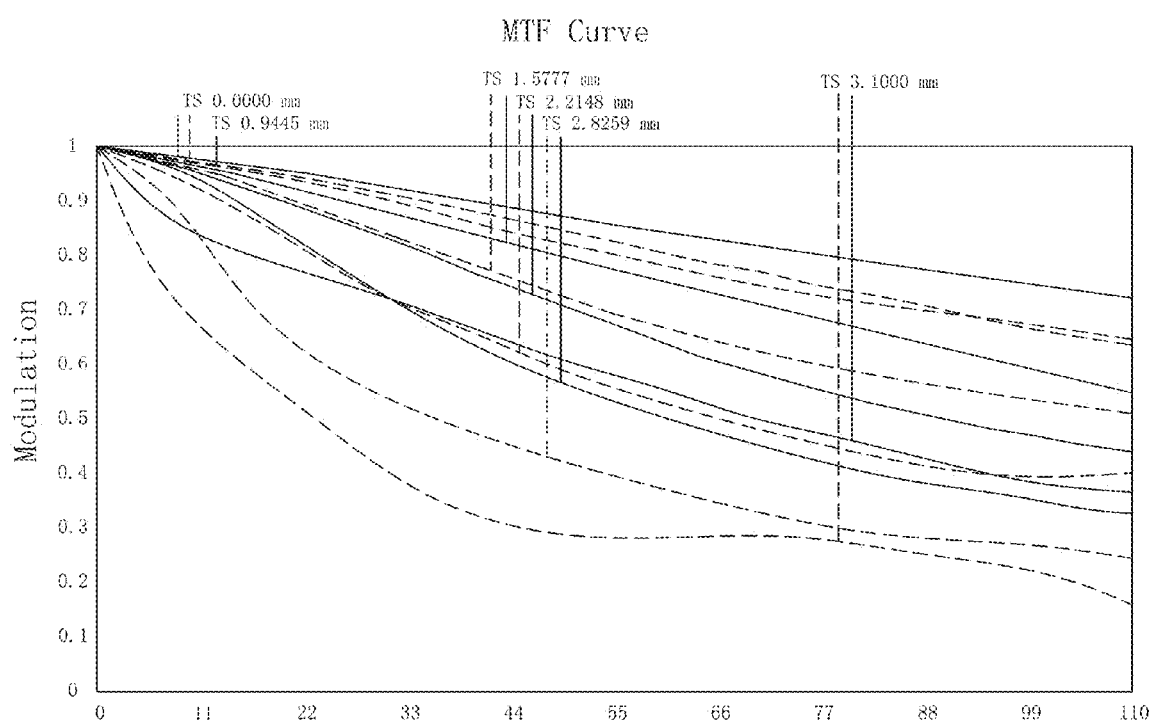
FIG. 2 is an MTF curve diagram of the photographic optical system shown in FIG. 1.
Figure 3:
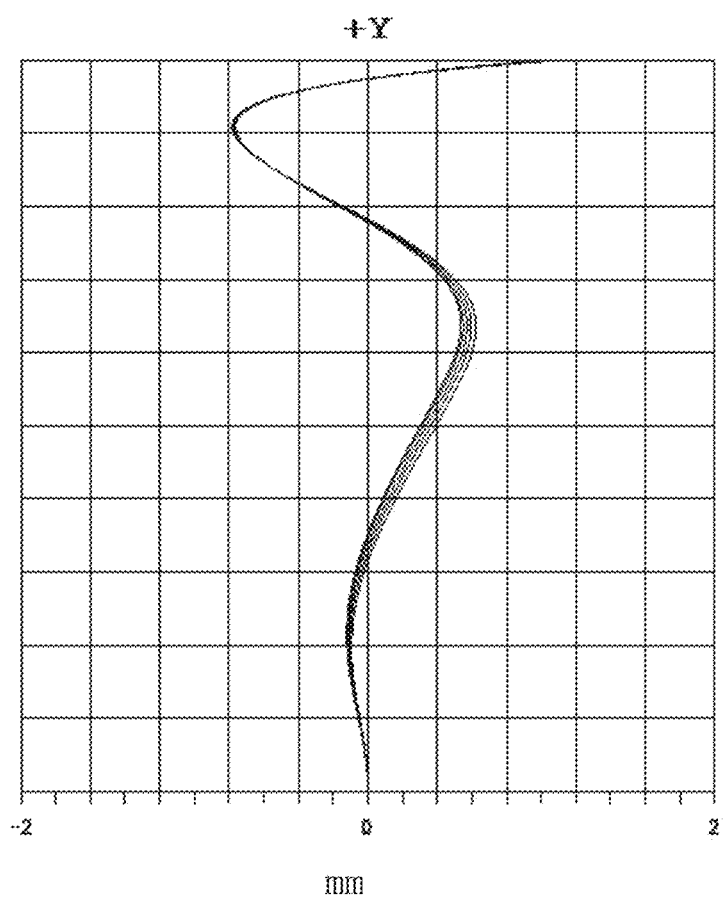
FIG. 3 is a field curvature curve diagram of the photographic optical system in FIG. 1.

Please also refer to FIGS. 2-3 at same time, the photographic optical system 1 disclosed in the present invention has high optical performance.

In this embodiment, DFOV=80.79 degrees, HFOV=69.43 degrees, VFOV=54.38 degrees, in which: FOV is defined as the biggest view angle range of the photographic optical system 1, HFOV is defined as horizontal view angle, DFOV is defined as diagonal view angle, VFOV is defined as vertical view angle.

In the photographic optical system 1 disclosed in the present invention, the photographic optical system 1 is designed on the basis of the optical system with large relative aperture. Total optical length is less than 5.1 mm, view angle is between 78 degree to 88 degree.

The photographic optical system 1 disclosed in the present invention has following beneficial effects:

The present invention, through optimizing surface type, distributing focal power, selecting optical material, a big relative aperture photographic optical system is designed. It is suitable for small electronic devices, can improve the imaging performance in low illumination environment. The image is clear. The first lens 110 is a positive focal power lens, can reduce effectively length of the system. The second lens 120 and the third lens 130 are made of the optical material with high refractive power (refractive power bigger than 1.60) and low abbe number (abbe number less than 30), can reduce effectively chromatic aberration of the system. The sixth lens 160 and the seventh lens 170 are negative focal power lenses, can reduce effectively the field curvature of the system.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A photographic optical system comprising, in an order from an object side to an image side:
   a first lens with double convex surfaces and having positive refractive power;
   a second lens with a convex object side surface and a concave image side surface;
   a third lens with a concave object side surface and a convex image side surface;
   a fourth lens with double convex surfaces;
   a fifth lens with a concave object side surface and a convex image side surface;
   a sixth lens having negative refractive power, and having a concave object side surface and a convex image side surface;
   a seventh lens with negative refractive power, including a concave object side surface and an image side surface transferred from concave to convex from area near optical axis to circumference; wherein the photographic optical system meets the following conditions (1)~(7):

$$0.6 < f1/f < 0.95 \tag{1}$$

$$-2 < f2/f < -1.5 \tag{2}$$

$$-3.5 < f3/f < -1.2 \tag{3}$$

$$1.5 < f4/f < 2.5 \tag{4}$$

$0.5 < f5/f < 1.0$ (5)

$-10 < f6/f < -5$ (6)

$-1 < f7/f < -0.5$ (7)

where,
f1: The focal length of the first lens;
f2: The focal length of the second lens;
f3: The focal length of the third lens;
f4: The focal length of the fourth lens;
f5: The focal length of the fifth lens;
f6: The focal length of the sixth lens;
f7: The focal length of the seven lens;
f: The focal length of whole photography optical system.

2. The photographic optical system as described in claim 1 further satisfying the following conditions:

$1.5 \text{ mm} < f1 < 3 \text{ mm}$ (1a)

$-6 \text{ mm} < f2 < -4 \text{ mm}$ (2a)

$-15 \text{ mm} < f3 < 7 \text{ mm}$ (3a)

$5 \text{ mm} < f4 < 10 \text{ mm}$ (4a)

$5 \text{ mm} < f5 < 10 \text{ mm}$ (5a)

$-35 \text{ mm} < f6 < -30 \text{ mm}$ (6a)

$-5 \text{ mm} < f7 < -2 \text{ mm}$ (7a).

3. The photographic optical system as described in claim 1 further satisfying the following conditions:

$1.50 < n1 < 1.55$ (1b)

$1.60 < n2 < 1.70$ (2b)

$1.60 < n3 < 1.70$ (3b)

$1.50 < n4 < 1.55$ (4b)

$1.50 < n5 < 1.55$ (5b)

$1.50 < n6 < 1.55$ (6b)

$1.50 < n7 < 1.55$ (7b)

where,
n1: The refractive power of the first lens;
n2: The refractive power of the second lens;
n3: The refractive power of the third lens;
n4: The refractive power of the fourth lens;
n5: The refractive power of the fifth lens;
n6: The refractive power of the sixth lens;
n7: The refractive power of the seven lens.

4. The photography optical system as described in claim 1 further satisfying the following conditions:

$40 < v1 < 60$ (1c)

$15 < v2 < 30$ (2c)

$15 < v3 < 30$ (3c)

$40 < v4 < 60$ (4c)

$40 < v5 < 60$ (5c)

$40 < v6 < 60$ (6c)

$40 < v7 < 60$ (7c)

where,
v1: Abbe number of the first lens;
v2: Abbe number of the second lens;
v3: Abbe number of the third lens;
v4: Abbe number of the fourth lens;
v5: Abbe number of the fifth lens;
v6: Abbe number of the sixth lens;
v7: Abbe number of the seven lens.

5. The photographic optical system as described in claim 1, wherein the first lens undertakes main optical refractive power of the photographic optical system.

6. The photographic optical system as described in claim 1, wherein a ratio between the focal length and the system total optical length of the photographic optical system meets following condition expression:

$f/TTL > 0.7$ wherein TTL is the distance from the object side surface to the imaging surface of the first lens.

7. The photographic optical system as described in claim 1, wherein the second lens and the third lens are made of material with high refractive index and low abbe number.

8. The photographic optical system as described in claim 1, wherein the sixth lens and seventh lens are negative lenses.

9. The photographic optical system as described in claim 1 further satisfying the following condition expression:

$TTL < 4.9 \text{ mm}$;

$78° < FOV < 88°$;

where, FOV is the biggest view angle range of the photographical optical system.

10. The photographic optical system as described in claim 6, wherein the image side surface of the seventh lens has at least one point of inflection and one stagnation point.

* * * * *